US012750923B2

(12) United States Patent
Hayase et al.

(10) Patent No.: US 12,750,923 B2
(45) **Date of Patent: *Sep. 29, 2026**

(54) CERAMIC BODY, HONEYCOMB STRUCTURE, METHOD FOR PRODUCING CERAMIC BODY AND HEATER ELEMENT

(71) Applicant: NGK Insulators, Ltd., Nagoya-City (JP)

(72) Inventors: Toru Hayase, Nagoya-City (JP); Hirofumi Yamaguchi, Komaki-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 806 days.

This patent is subject to a terminal disclaimer.

(21) Appl. No.: 18/174,813

(22) Filed: Feb. 27, 2023

(65) Prior Publication Data

US 2023/0309195 A1 Sep. 28, 2023

(30) Foreign Application Priority Data

Mar. 23, 2022 (JP) ................................ 2022-047404

(51) Int. Cl.
*C04B 38/00* (2006.01)
*C04B 35/468* (2006.01)
(Continued)

(52) U.S. Cl.
CPC ......... *H05B 3/141* (2013.01); *C04B 35/4682* (2013.01); *C04B 38/0006* (2013.01);
(Continued)

(58) Field of Classification Search
CPC ........... C04B 35/4682; C04B 38/0006; C04B 38/0058; C04B 38/0067;
(Continued)

(56) References Cited

U.S. PATENT DOCUMENTS 4,606,906 A * 8/1986 Ritter .................. C01G 23/006 501/12
6,559,084 B1 * 5/2003 Fujikawa ............ H01G 4/1227 361/321.5
(Continued)

FOREIGN PATENT DOCUMENTS

DE 10 2021 213 863 A1 7/2022
EP 2487142 A1 * 8/2012 ............... H01B 1/08
(Continued)

OTHER PUBLICATIONS

German Office Action (with English translation) dated Dec. 16, 2025 (Application No. 10 2023 106 890.3).

*Primary Examiner* — Noah S Wiese
(74) *Attorney, Agent, or Firm* — Muncy, Geissler, Olds & Lowe, P.C.

(57) ABSTRACT

A ceramic body mainly based on $BaTiO_3$-based crystalline particles in which a part of Ba is substituted with at least one rare earth element and at least one alkaline earth metal element. The ceramic body contains from 1.0 to 8.0% by mass of $Ba_6Ti_{17}O_{40}$ crystalline particles. The $BaTiO_3$-based crystal particles have a substituted amount of one mol of the Ba with the alkaline earth metal element of 0.01 to 0.10 mol.

20 Claims, 10 Drawing Sheets

10

(51) Int. Cl.

*C04B 38/06* (2006.01)
*H05B 3/14* (2006.01)
*H05B 3/26* (2006.01)

(52) U.S. Cl.

CPC ...... *C04B 38/0058* (2013.01); *C04B 38/0067* (2013.01); *C04B 38/0695* (2013.01); *H05B 3/26* (2013.01); *H05B 2203/02* (2013.01); *H05B 2203/023* (2013.01); *H05B 2203/024* (2013.01)

(58) Field of Classification Search

CPC .... C04B 2235/3208; C04B 2235/3213; C04B 2235/3215; C04B 2235/3227; C04B 2235/761

See application file for complete search history.

(56) References Cited

U.S. PATENT DOCUMENTS

| | | | | |
|---|---|---|---|---|
| 2011/0210815 | A1 | 9/2011 | Abe et al. | |
| 2012/0081206 | A1 | 4/2012 | Kishimoto et al. | |
| 2013/0241347 | A1 * | 9/2013 | Suzuki | H02N 2/106 252/62.9 PZ |
| 2015/0069308 | A1 * | 3/2015 | Shimada | H01B 1/08 252/519.12 |
| 2015/0091690 | A1 | 4/2015 | Aoto et al. | |
| 2016/0027560 | A1 | 1/2016 | Itoh et al. | |
| 2016/0204335 | A1 * | 7/2016 | Oshima | H10N 30/20 310/314 |
| 2022/0227672 | A1 * | 7/2022 | Hayase | B60H 1/2215 |

FOREIGN PATENT DOCUMENTS

| | | | | |
|---|---|---|---|---|
| JP | 2013-079160 | A | 5/2013 | |
| JP | 5327553 | B2 | 10/2013 | |
| JP | 5510455 | B2 | 6/2014 | |
| JP | 5930118 | B2 | 6/2016 | |
| JP | 5970717 | B2 | 8/2016 | |
| JP | 2017-027980 | A | 2/2017 | |
| WO | WO-2015012057 | A1 * | 1/2015 | H01C 7/025 |

* cited by examiner

CERAMIC BODY, HONEYCOMB STRUCTURE, METHOD FOR PRODUCING CERAMIC BODY AND HEATER ELEMENT

CROSS REFERENCE TO RELATED APPLICATIONS

The present invention claims the benefit of priority to Japanese Patent Application No 2022-047404 filed on Mar. 23, 2022 with the Japanese Patent Office, the entire contents of which are incorporated herein by reference in its entirety.

FIELD OF THE INVENTION

The present invention relates to a ceramic body, a honeycomb structure, a method for producing the ceramic body and a heater element.

BACKGROUND OF THE INVENTION

Conventionally, a ceramic body obtained by adding various additive elements to a composition represented by $BaTiO_3$ is proposed as a material exhibiting a PTC (Positive Temperature Coefficient) property. The PTC property is a property in which a resistant value is rapidly increased at elevated temperature that is higher than or equal to a Curie point. The ceramic body having the PTC property have been used for PTC heaters, PTC switches, overcurrent protection devices, temperature detectors, and the like, and various properties have been improved depending on the applications.

Patent Literature 1 discloses that the use of Y, Ho, Er, and Yb in $BaTiO_3$ and the multiple addition of La, Dy, Eu, and Gd with Y, Ho, Er, and Yb in appropriate amounts provide a porcelain composition for PTC thermistors, which has a small change over time, and practical values for both resistivity at room temperature and resistant temperature coefficient.

Patent Literature 2 discloses semiconductor ceramics mainly based on a $Ba_mTiO_3$-based composition having a perovskite-type structure represented by the general formula: $A_mBO_3$, wherein W as a semiconducting agent is substituted in a range of 0.05 mol % to 0.3 mol % of 100 mol % of Ti; the symbol m, which is a ratio of A sites occupied mainly by Ba to B sites occupied mainly by Ti, satisfies $0.99 \leq m \leq 1.002$; and the semiconductor ceramics contains Ca in a range of 15 mol % or less when the total number of moles of elements constituting the A sites is 100 mol %: and when a temperature at which a resistance value becomes twice a resistance value at 25° C. is defined as a doubling point, the doubling point is 100° C. or more, and a measured sintered density is 70% or more and 90% or less of theoretical sintered density. It also mentions that the semiconductor ceramics has a stable PTC property, a higher doubling point, and a wider operating temperature range.

Patent Literature 3 discloses that a barium titanate PTC thermistor which can easily form a semiconductor in either air or nitrogen atmosphere sintering, and which has lower specific resistivity at normal temperature and a Curie point shifted to a higher temperature side than 120° C., can be obtained by substituting a part of Ba with Bi and alkali metal A (Na or K) in a predetermined range, rather than Pb which has a higher environmental impact, and by maintaining a molar ratio of Ba sites to Ti sites and an amount of Ca added in predetermined ranges. It also discloses that a change over time can be reduced even if the PTC thermistor can be used as a heater element.

Patent Literature 4 disclosed that a stacked PTC thermistor having decreased specific resistance at normal temperature and increased voltage resistance can be obtained by using highly crystalline tetragonal barium titanate powder as a raw material in place of cubic barium titanate powder, and by controlling a slope of a change in resistance within grains to an inverse number of a Kelvin temperature to be 135 or more and 340 or more in 123 Kelvin to 163 Kelvin, to have an average porcelain grain diameter of 0.8 μm or less after sintering.

Patent Literature 5 discloses a stacked PTC thermistor device that uses a ceramic substrate, wherein the ceramic substrate is mainly based on barium titanate doped with a rare earth element(s), and has an average porcelain grain size of 0.3 [μm] or more and less than 0.5 [μm], and wherein a lower limit of a relative density of the ceramic substrate is 70 [%], and an upper limit of the relative density of the ceramic substrate is −6.43 d+97.83 [%] in which d is the porcelain grain size. It also discloses that the stacked PTC thermistor device can achieve both the low specific resistance at normal temperature and high voltage resistance.

Patent Literature 6 discloses a non-lead semiconductor ceramic that is substantially lead-free, wherein the ceramic is mainly based on a $BaTiO_3$-based composition having a perovskite-type structure represented by the general formula: $A_mBO_3$, and a part of Ba making up A sites with an alkali metal element(s), Bi, Ca, Sr, and a rare earth element(s), and wherein Ca and Sr contents when the total number of moles of the elements making up the A sites is one mole, satisfy $0.05 \leq x \leq 0.20$, $0.02 \leq y \leq 0.12$, and $2x+5y \leq 0.7$, in which x is a molar ratio of Ca and y is a molar ratio of Sr. It also discloses that the semiconductor ceramic has excellent reliability because surface discoloration does not occur even if a current is conducted to the ceramic for a long period of time, and a change in resistance value is suppressed while maintaining a desired Curie point.

PRIOR ART

Patent Literatures

[Patent Literature 1] Japanese Patent Application Publication No. 2013-79160 A

[Patent Literature 2] Japanese Patent No. 5510455 B

[Patent Literature 3] Japanese Patent No. 5930118B

[Patent Literature 4] Japanese Patent Application Publication No. 2017-27980 A

[Patent Literature 5] Japanese Patent No. 5970717 B

[Patent Literature 6] Japanese Patent No. 5327553 B

SUMMARY OF THE INVENTION

The present invention relates to a ceramic body, the ceramic body being mainly based on $BaTiO_3$-based crystalline particles in which a part of Ba is substituted with at least one rare earth element and at least one alkaline earth metal element, wherein the ceramic body comprises from 1.0 to 8.0% by mass of $Ba_6Ti_{17}O_{40}$ crystalline particles, and wherein the $BaTiO_3$-based crystal particles have a substituted amount of one mol of the Ba with the alkaline earth metal element of 0.01 to 0.10 mol.

Also, the present invention relates to a honeycomb structure, comprising: an outer peripheral wall; and partition walls disposed on an inner side of the outer peripheral wall, the partition walls defining a plurality of cells, each of the cells forming a flow path from a first end face to a second end face, wherein the outer peripheral wall and the partition walls are made of the ceramic body.

The present invention also relates to a method for producing a ceramic body, the method comprising:

a forming step of forming a green body containing a ceramic raw material comprising $BaCO_3$ powder, $TiO_2$ powder, at least one powder selected from carbonates, sulfates and acetates of alkaline earth metals, and powder of a nitrate and/or hydroxide of a rare earth to produce a ceramic formed body having a relative density of 60% or more; and a firing step of maintaining the ceramic formed body at a temperature of 1150 to 1250° C., and then increasing the temperature to a maximum temperature of 1360 to 1430° C. at a heating rate of 20 to 500° C./hour and maintaining it for 0.5 to 5 hours.

The present invention also relates to a heater element comprising the honeycomb structure as described above.

DETAILED DESCRIPTION OF THE INVENTION

Figure 1:
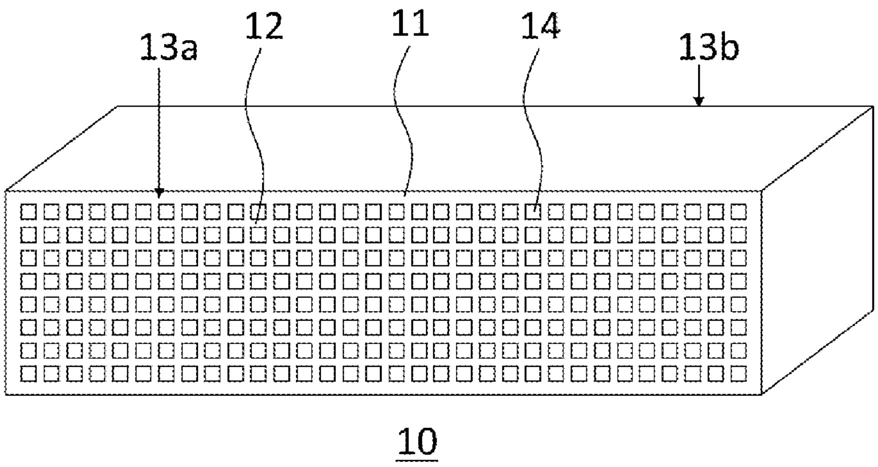
FIG. 1 is a schematic perspective view of a ceramic body according to an embodiment of the present invention.

As described above, ceramic bodies having the PTC property have been improved from various viewpoints, but there is still room for development.

For example, the application of the honeycomb-shaped ceramic body to a heater element for heating has been studied. If the heater element is to function at a low voltage, an electrical resistivity at room temperature (25° C.) (which is, hereinafter, referred to as a "room temperature resistivity" should be lower. Further, in the heater element, a pair of electrodes are generally provided on end faces (faces perpendicular to an extending direction of cells) of the honeycomb-shaped ceramic body, but the pair of electrodes face a flow path for a gas, which may cause corrosion of the pair of electrodes. Therefore, it has been considered to provide a pair of electrodes on the side of the honeycomb-shaped ceramic body (parallel to the extending direction of the cells).

However, in a case where a pair of electrodes are provided on the side of the ceramic body, a distance between the electrodes is larger than in a case where a pair of electrodes are provided on the end faces of the ceramic body. Therefore, it requires further lower room temperature electrical resistivity of the ceramic body. This requirement is particularly high in the case of honeycomb-shaped ceramic bodies where the thickness of the partition wall is lower. Further, to interrupt stably the current when the ceramic body with low room temperature resistivity reaches an abnormal temperature, it also requires an electrical resistivity at 200° C. (which is, hereinafter, referred to as a "200° C. resistivity") of 500 times or more the room temperature resistivity.

The present invention has been made in view of the above circumstances. An object of the present invention is to provide a ceramic body, honeycomb structure, and a method for producing the ceramic body, which have a lower room temperature electrical resistivity and a 200° C. resistivity of 500 times or more the room temperature resistivity. Also, an object of the present invention is to provide a heater element including such a honeycomb structure.

As a result of intensive studies for ceramic bodies mainly based on $BaTiO_3$-based crystalline particles, the present inventors have found that a content of $Ba_6Ti_{17}O_{40}$ crystalline particles and an amount of Ba of $BaTiO_3$-based crystalline particles substituted with an alkaline earth metal element are closely related to the room temperature electrical resistivity and the 200° C. resistivity, and they have completed the present invention.

According to the present invention, it is possible to provide a ceramic body, honeycomb structure, and a method for producing the ceramic body, which have a lower room temperature electrical resistivity and a 200° C. resistivity of 500 times or more the room temperature resistivity. Also, according to the present invention is to provide a heater element including such a honeycomb structure.

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

<Ceramic Body>

(1-1) Crystal Structure and Composition

The ceramic body according to an embodiment of the present invention is mainly based on $BaTiO_3$-based crystalline particles in which a part of Ba is substituted with at least one rare earth element and at least one alkaline earth metal element. The use of $BaTiO_3$-based crystalline particles as the main component can result in a ceramic body that can generate heat by current conduction and has a PTC property. Further, by substituting a part of Ba of the $BaTiO_3$-based crystalline particles with the rare earth element and the alkaline earth metal element, the 200° C. resistivity can be 500 times or more the room temperature resistivity while reducing the room temperature resistivity.

As used herein, "mainly based on" means that a percentage of those particles relative to the total component is 50% by mass or more.

In the $BaTiO_3$-based crystalline particles, a substituted amount of one mol of Ba with the alkaline earth metal element is 0.01 to 0.10 mol. By controlling the substituted amount with the alkaline earth metal element to such a range, the room temperature resistivity and the 200° C. resistivity can be controlled to predetermined ranges. From the viewpoint of stably reducing the room temperature resistivity, the substituted amount of 1 mol of Ba with the alkaline earth metal element is preferably 0.08 mol or less, and more preferably 0.06 mol or less, and particularly preferably 0.03 mol or less.

Non-limiting examples of the alkaline earth metal element include Be, Mg, Ca, Sr, and Ba. Among these elements, Sr and Ca are preferred. Moreover, these elements can be used alone or in combination of two or more.

In the $BaTiO_3$-based crystalline particles, a substituted amount of one mol of Ba with the rare earth element is not particularly limited, but it may preferably be 0.001 to 0.010 mol. By controlling the substituted amount with the rare earth element to such a range, the room temperature resistivity can be stably controlled to a predetermined range. From the viewpoint of preventing the room temperature resistivity from becoming too high, the substituted amount of one mol of Ba with the rare earth element is preferably 0.0015 or more, and more preferably 0.002 or more. Further, the substituted amount of 1 mol of Ba with the rare earth element is preferably 0.009 or less, and more preferably 0.008 or less, from the viewpoint of preventing the room temperature resistivity from becoming too high due to insufficient sintering.

Non-limiting examples of the rare earth element include La, Ce, Pr, Nd, Eu, Gd, Dy, Ho, Er, Yb and the like. Among these elements, La is preferred. Moreover, these elements can be used alone or in combination of two or more.

The $BaTiO_3$-based crystalline particles can generally be expressed by the following compositional formula: $(Ba_{1-x-y}A^1_xA^2_y)TiO_3$. In the compositional formula, the symbol $A^1$ can represent at least one rare earth element, $A^2$ can represent one or more alkaline earth metal elements, and x can be 0.001 to 0.010, and y can be 0.01 to 0.10.

The $BaTiO_3$-based crystalline particles preferably have a mole ratio: (Ba+rare earth element+alkaline earth metal element)/Ti of from 1.001 to 1.020. By controlling the mole ratio to such a range, the room temperature resistivity and the 200° C. resistivity can be stably controlled to predetermined ranges. The mole ratio can be determined by, for example, X-ray fluorescence analysis and ICP-MS (inductively coupled plasma mass spectrometry).

The $BaTiO_3$-based crystalline particles preferably have a lattice volume of from 63.800 to 64.360 $Å^3$, and more preferably from 63.800 to 64.340 $Å^3$, and even more preferably from 64.000 to 64.340 $Å^3$ By controlling the lattice volume in such a range, the 200° C. resistivity can be stably controlled to the predetermined range.

The lattice volume of the $BaTiO_3$-based crystalline particles can be measured using an X-ray diffractometer. More particularly, the lattice volume can be measured from a lattice constant obtained by analyzing the X-ray diffraction data by the Rietveld method.

The $BaTiO_3$-based crystalline particles preferably have an average crystal grain size of from 10 to 100 μm, and more preferably from 15 to 95 μm. By controlling the average crystal grain size to such a range, the room temperature resistivity and the 200° C. resistivity can be stably controlled to the predetermined ranges.

The average crystal grain size of the $BaTiO_3$-based crystalline particles can be measured as follows. A square sample having 5 mm×5 mm×5 mm is cut out from the ceramic body and encapsulated with a resin. The encapsulated sample is mirror-polished by mechanical polishing and observed by SEM. The SEM observation is carried out using, for example, a model S-3400N from Hitachi High-Tech Corporation, at an acceleration voltage of 15 kV and at magnifications of 3000. In the SEM observation image (30 μm in length×45 μm in width), four straight lines each having a thickness of 0.3 μm were drawn at intervals of 10 μm across the entire vertical direction of the field of view, and the number of $BaTiO_3$-based crystalline particles through which these lines pass even at a part of them is counted. An average of the SEM images at four or more positions where the length of the straight line is divided by the number of $BaTiO_3$-based crystalline particles is defined as the average crystal grain size.

The content of the $BaTiO_3$-based crystalline particles in the ceramic body is not particularly limited as long as it is determined to be the main component, but it may preferably be 92.0% by mass or more, and more preferably 93.0% by mass or more, and even more preferably 94.0% by mass or more. The upper limit of the content of the $BaTiO_3$-based crystalline particles is not particularly limited, but it may generally be 99.0% by mass, and preferably 98.0% by mass.

The content of the $BaTiO_3$-based crystalline particles can be measured by, for example, fluorescent X-ray analysis or EDAX (energy dispersive X-ray) analysis. Other crystalline particles can be measured in the same manner as this method.

The ceramic body according to an embodiment of the present invention contains $Ba_6Ti_{17}O_{40}$ crystalline particles.

The content of the $Ba_6Ti_{17}O_{40}$ crystalline particles in the ceramic body may be from 1.0 to 8.0% by mass, and preferably from 1.2 to 7.5% by mass, and even more preferably from 3.0 to 7.5% by mass. By controlling the content of the $Ba_6Ti_{17}O_{40}$ crystalline particles to such a range, the room temperature resistivity can be controlled to the predetermined range. While not wishing to be bound by any theory, it is believed that the room temperature resistivity is reduced because the $Ba_6Ti_{17}O_{40}$ crystalline particles liquefy during a sintering process to promote rearrangement, grain growth and densification of the $BaTiO_3$-based crystalline particles.

The ceramic body according to an embodiment of the present invention can further contain $BaCO_3$ crystalline particles. The $BaCO_3$ crystalline particles are those derived from $BaCO_3$ powder, which is a raw material for the ceramic body.

The $BaCO_3$ crystalline particles may not be contained in the ceramic body because they have substantially no effect on the room temperature resistivity of the ceramic body at room temperature. However, if the content of $BaCO_3$ crystalline particles in the ceramic body is too high, it may affect the room temperature resistivity, and the number of other crystalline particles may decrease, so that desired properties may not be obtained. Therefore, the content of the $BaCO_3$ crystalline particles in the ceramic body is preferably 1.0% by mass or less, and more preferably 0.8% by mass or less, and further preferably 0.5% by mass or less. The lower limit of the content of $BaCO_3$ crystalline particles is not particularly limited, but it may be 0% by mass, for example, 0.1% by mass, or 0.2% by mass.

The ceramic body according to an embodiment of the present invention may further contain a component(s) conventionally added to PTC materials, in addition to the above crystalline particles. Such a component includes additives such as shifters, property improving agents, metal oxides and conductor powder, as well as unavoidable impurities.

In terms of reduction of the environmental load, it is desirable that the ceramic body according to an embodiment of the present invention is substantially free of lead (Pb). More particularly, the ceramic body according to the embodiment of the present invention preferably has a Pb content of 0.01% by mass or less, and more preferably 0.001% by mass or less, and still more preferably 0% by mass. The lower Pb content can allow heated air to be safely applied to organisms such as humans by contacting the ceramic body, for example, when the ceramic body is used for the heater element. In the ceramic body according to the embodiment of the present invention, the Pb content is preferably less than 0.03% by mass, and more preferably less than 0.01% by mass, and further preferably 0% by mass, as converted to PbO. The lead content can be determined by, for example, fluorescent X-ray analysis, ICP-MS (inductively coupled plasma mass spectrometry), or the like.

It is preferable that the ceramic body according to an embodiment of the present invention is substantially free of an alkali metal element which may affect the room temperature resistivity. More particularly, the ceramic body according to the embodiment of the present invention preferably has an alkali metal element content of 0.01% by mass or less, and more preferably 0.001% by mass or less, and still more preferably 0% by mass. By controlling the content of the alkali metal element to such a range, the room temperature resistivity can be stably reduced. The alkali metal element content can be determined by, for example, fluorescent X-ray analysis, ICP-MS (inductively coupled plasma mass spectrometry), or the like.

(1-2) Open Porosity

The open porosity of the ceramic body according to an embodiment of the present invention is a factor that will affect the room temperature resistivity. Therefore, the open porosity of the ceramic body according to the embodiment of the present invention is preferably controlled to 7.0% or less, and more preferably 6.5% or less. By controlling the open porosity to such a range, the ceramic body can be densified, so that the room temperature resistivity can be stably reduced. The lower limit of the open porosity is not particularly limited, but it may generally be 0.1%, and preferably 0.5%.

The open porosity of the ceramic body can be measured by the Archimedes method using pure water as a medium. The open porosity can be controlled by adjusting conditions such as an amount of a pore former or a sintering aid used in production of the ceramic body, and a firing atmosphere.

(1-3) Bulk Density

The bulk density of the ceramic body according to an embodiment of the present invention is a factor that will affect the room temperature resistivity. Therefore, the bulk density of the ceramic body according to the embodiment of the present invention is preferably controlled to 5.30 g/cm$^3$ or more. By controlling the bulk density to such a range, the room temperature resistivity can be stably reduced. The upper limit of the bulk density is not particularly limited, but it may generally be 7.00 g/cm$^3$, and preferably 6.00 g/cm$^3$.

The bulk density of the ceramic body can be measured by the Archimedes method using pure water as a medium, as in the open porosity. The bulk density can be controlled by adjusting conditions such as an amount of a dispersion medium, a binder, a plasticizer, a dispersant and the like used in production of the ceramic body, and the firing atmosphere.

(1-4) Volume Resistivity

The ceramic body according to an embodiment of the present invention preferably has a volume resistivity measured at 25° C. of 20 Ω·cm or less, and more preferably 19 Ω·cm or less, and still more preferably 18 Ω·cm. The volume resistivity in such a range can be determined to be a lower room temperature resistivity. The lower room temperature resistivity can ensure heat generation performance required for heating, and can suppress an increase in power consumption. The lower limit of the volume resistivity measured at 25° C. is not particularly limited, but it may generally be 0.1 Ω·cm, and preferably 1.0 Ω·cm.

The volume resistivity of the ceramic body can be measured as follows. Two or more samples each having a dimension of 30 mm×30 mm×15 mm are randomly cut and collected from the ceramic body. The electrical resistance at the measurement temperature is then measured by the two-terminal method, and the volume resistivity is calculated from shapes of the samples. An average value of the volume resistivities of all the samples is defined as a measured value at a measured temperature. The volume resistivity at each temperature as described below can also be measured in the same manner.

The ceramic body according to the embodiment of the present invention has a volume resistivity measured at 120° C. of preferably 30 Ω·cm to 500 Ω·cm, and more preferably 32 Ω·cm to 400 Ω·cm. The volume resistivity in this range can ensure a PTC property suitable for applications as described below.

In the ceramic body according to the embodiment of the present invention, the volume resistivity measured at 200° C. is preferably 500 times or more, more preferably 1000 times or more, the volume resistivity measured at 25° C. If the ceramic body is used for the application as described below, such a volume resistivity measured at 200° C. can stably interrupt current when the ceramic body reaches an abnormal temperature.

(1-5) Application

The ceramic body according to an embodiment of the present invention can be used, for example, in a PTC heater, a PTC switch, an overcurrent protection element, and a temperature detector, although not limited thereto. Among these, the ceramic body according to the embodiment of the present invention can be suitably used as a heater element for heating, particularly as a heater element for heating a vehicle interior. The vehicle includes, but not limited to, automobiles and trains. Non-limiting examples of the automobile include a gasoline vehicle, a diesel vehicle, a fuel cell vehicle, an electric vehicle, and a plug-in hybrid vehicle. The heater element according to the embodiment of the present invention can be particularly suitably used for a vehicle having no internal combustion engine such as electric vehicles and trains.

(1-6) Shape

The shape of the ceramic body according to an embodiment of the present invention may be appropriately selected depending on the applications, and is not particularly limited. For example, when considering the use of the ceramic body as a heater element, it can have a wall-flow type or flow-through type honeycomb shape, but it may preferably have the flow-through type honeycomb shape.

Here, FIG. 1 shows a schematic perspective view of a ceramic body having a flow-through type honeycomb shape (hereinafter, referred to as a "honeycomb structure") according to an embodiment of the present invention. A honeycomb structure 10 according to the embodiment of the present invention has a honeycomb structure including: an outer peripheral wall 11; and partition walls 12 which are arranged on an inner side of the outer peripheral wall 11, and which define a plurality of cells 14 that form flow paths from a first end face 13_a_ to a second end face 13_b_.

The shape of each end face (first end face 13*a* and second end face 13*b*) of the honeycomb structure 10 is not particularly limited, but it may be any shape such as a polygonal (quadrangular (rectangular, square), pentagonal, hexagonal, heptagonal, octagonal, etc.) shape, a circular shape, an oval shape and an L shape. If each end face is polygonal, the corners may be chamfered. It is preferable that the shape of each end face and the shape of the cross section orthogonal to the extending direction of the cells 14 are the same as each other.

The shape of each cell 14 in the cross section orthogonal to the extending direction of the cells 14 is not limited, but it may preferably be a quadrangle (rectangle, square), a hexagon, an octagon, or a combination thereof. Among these, the shape of each cell 14 is preferably square and/or hexagonal. By forming the cells 14 each having such a shape, it is possible to reduce the pressure loss when a gas passes through the honeycomb structure 10. The honeycomb structure 10 of FIG. 1 shows a case where the shape of each cell 14 in the cross section orthogonal to the extending direction of the cells 14 is square.

The partition walls 12 preferably have an average thickness of from 50 to 130 μm, and more preferably 55 to 120 μm, and even more preferably 60 to 110 μm, although not limited thereto. The average thickness of the partition walls 12 of 50 μm or more can ensure the strength of the honeycomb structure 10 while controlling the room temperature resistivity and the 200° C. resistivity to the predetermined ranges. Further, the average thickness of the partition walls 12 of 130 μm or less can lead to a compact honeycomb structure 10.

As used herein, the thickness of each partition wall 12 refers to a length in which a line segment crosses the partition wall 12 when centers of gravity of adjacent cells 14 are connected by the line segment in the cross section orthogonal to the extending direction of the cells 14. The average thickness of the partition walls 12 refers to an average value of the thicknesses of all the partition walls 12.

A cell density is not particularly limited, but it may preferably be from 15 to 140 cells/cm$^2$, and more preferably from 46 to 94 cells/cm$^2$. The cell density of 15 cells/cm$^2$ or more can provide the honeycomb structure 10 suitable for heating while controlling the room temperature resistivity and the 200° C. resistivity to the predetermined ranges. Further, the cell density of 140 cells/cm$^2$ or less can allow ventilation resistance to be suppressed and an output of a blower to be suppressed.

As used herein, the cell density can be obtained by dividing the number of cells by an area of each end face of the honeycomb structure 10.

The honeycomb structure 10 shown in FIG. 1 can be used as a heater element and can generate heat by current conduction. Therefore, a gas such as outside air or vehicle interior air can be heated by heat transfer from the heated partition walls 12 from a time when the gas flows in the first end face 13*a* until the gas passes through the plurality of cells 14 and flows out from the second end face 13*b*.

The ceramic body according to an embodiment of the present invention may be a honeycomb joined body having honeycomb segments and joining layers for joining the honeycomb segments. The use the honeycomb joined body can increase the total cross-sectional area of the cells 14, which is important for ensuring a flow rate of a gas, while suppressing generation of cracks.

Figure 2:
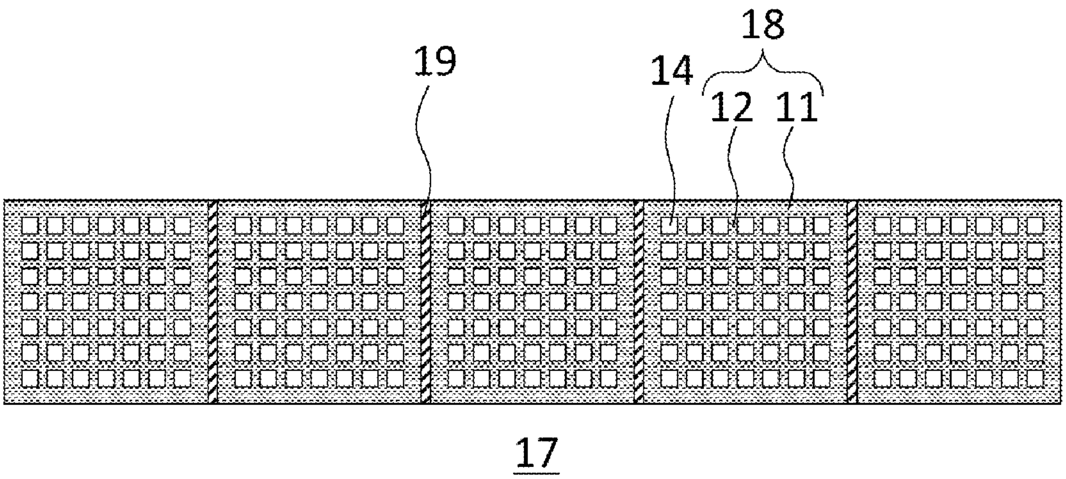
FIG. 2 is a schematic cross-sectional view orthogonal to a central axis of a honeycomb joined body having five honeycomb segments.

Here, as an example, FIG. 2 shows a schematic cross-sectional view orthogonal to a central axis of a honeycomb joined body having five honeycomb segments.

As shown in FIG. 2, the honeycomb joined body 17 has five honeycomb segments 18 and joining layers 19 for joining the honeycomb segments 18. Each honeycomb segment 18 has the outer peripheral wall 11 and the partition walls 12 which are arranged on the inner side of the outer peripheral wall 11 and which define a plurality of cells 14 that form flow paths from the first end face 13*a* to the second end face 13*b*.

Each joining layer 19 can be formed by using a joining material. The joining material is not particularly limited, but a ceramic material obtained by adding a solvent such as water to form a paste can be used. The joining material may contain ceramics having a PTC property, or may contain the same ceramics as the outer peripheral wall 11 and the partition walls 12. In addition to the role of joining the honeycomb segments 18 to each other, the joining material can also be used as an outer peripheral coating material after joining the honeycomb segments 18.

(1-7) Production Method

A method for producing the ceramic body according to the embodiment of the present invention includes a forming step and a firing step. Hereinafter, a case of producing a ceramic body (honeycomb structure 10) having a honeycomb shape will be described as an example.

In the forming step, a green body containing a ceramic raw material including $BaCO_3$ powder, $TiO_2$ powder, at least one powder selected from carbonates, sulfates and acetates of alkaline earth metals, and powder of a nitrate and/or hydroxide of a rare earth is formed to prepare a ceramic formed body (hereinafter, which may be referred to as a "honeycomb formed body") having a relative density of 60% or more. In particular, by blending the at least one powder selected from carbonates, sulfates and acetates of alkaline earth metals, and powder of a nitrate and/or hydroxide of a rare earth, any aggregation of $BaCO_3$ powder in the green body can be suppressed, thereby facilitating uniform liquid phase formation and grain growth in the firing step. As a result, it is easy to obtain the honeycomb structure 10 having the room temperature electrical resistivity and the 200° C. resistivity controlled to the predetermined ranges.

The alkaline earth element and rare earth element are not particularly limited, and those described above may be used.

The green body can be obtained by adding a dispersion medium, a binder, a plasticizer and a dispersant to the ceramic raw material and kneading them. The green body may optionally contain additives such as shifters, metal oxides, property improving agents, and conductor powder.

The blending amount of the components other than the ceramic raw material is not particularly limited as long as the relative density of the ceramic formed body is 60%.

As used herein, the "relative density of the ceramic formed body" means a ratio of the density of the ceramic formed body to the true density of the entire ceramic raw material. More particularly, the relative density can be determined by the following equation:

$$\text{relative density of ceramic formed body (\%)} = \text{density of ceramic formed body (g/cm}^3\text{)} / \text{true density of entire ceramic raw material (g/cm}^3\text{)} \times 100.$$

The density of the ceramic formed body can be measured by the Archimedes method using pure water as a medium. Further, the true density of the entire ceramic raw material can be obtained by dividing the total mass of the respective raw materials (g) by the total volume of the actual volumes of the respective raw materials (cm$^3$).

Examples of the dispersion medium include water or a mixed solvent of water and an organic solvent such as alcohol, and more preferably water.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose in combination with hydroxypropoxyl cellulose. The binder may be used alone, or in combination of two or more, but it is preferable that the binder does not contain an alkali metal element.

Examples of the plasticizer include polyoxyalkylene alkyl ethers, polycarboxylic acid-based polymers, and alkyl phosphate esters.

The dispersant that can be used herein includes surfactants such as polyoxyalkylene alkyl ether, ethylene glycol, dextrin, fatty acid soaps, and polyalcohol. The dispersant may be used alone or in combination of two or more.

The ceramic formed body can be produced by extrude the green body. In the extrusion, a die having a desired overall shape, cell shape, partition wall thickness, cell density and the like can be used.

The relative density of the ceramic formed body obtained by extrusion is 60% or more, and preferably 61% or more. By controlling the relative density of the ceramic formed body to such a range, the ceramic body can be densified and the room temperature electrical resistivity and the 200° C. resistivity can be controlled to the predetermined ranges. The upper limit of the relative density of the ceramic formed body is not particularly limited, but it may generally be 80%, and preferably 75%.

The ceramic formed body can be dried before the firing step. Non-limiting examples of the drying method include conventionally known drying methods such as hot air drying, microwave drying, dielectric drying, drying under reduced pressure, drying in vacuum, and freeze drying. Among these, a drying method that combines the hot air drying with the microwave drying or dielectric drying is preferable in that the entire formed body can be rapidly and uniformly dried.

The firing step includes maintaining the ceramic formed body at a temperature of from 1150 to 1250° C., and then increasing the temperature to a maximum temperature of from 1360 to 1430° C. at a heating rate of 20 to 500° C./hour, and maintaining the temperature for 0.5 to 5 hours.

The maintaining of the honeycomb formed body at the maximum temperature of from 1360 to 1430° C. for 0.5 to 5 hours can provide a ceramic body (honeycomb structure 10) mainly based on $BaTiO_3$-based crystal particles in which a part of Ba is substituted with the rare earth element and the alkaline earth metal element.

Further, the maintaining at the temperature of from 1150 to 1250° C. can allow the $Ba_2TiO_4$ crystal particles generated in the firing step to be easily removed, so that the honeycomb structure 10 can be densified.

Further, the heating rate of 20 to 500° C./hour from the temperature of 1150 to 1250° C. to the maximum temperature of 1360 to 1430° C. can allow 1.0 to 8.0% by mass of $Ba_6Ti_{17}O_{40}$ crystal particles to be formed in the honeycomb structure 10.

The retention time at 1150 to 1250° C. is not particularly limited, but it may preferably be from 0.5 to 5 hours. Such a retention time can lead stable and easy removal of $Ba_2TiO_4$ crystal particles generated in the firing step.

Prior to the maintaining at 1150 to 1250° C., the firing step preferably includes maintaining at 900 to 950° C. for 0.5 to 5 hours. The maintaining at 900 to 950° C. for 0.5 to 5 hours can lead to sufficient decomposition of $BaCO_3$, so that the honeycomb structure 10 having a predetermined composition can be easily obtained.

Prior to the firing step, a degreasing step for removing the binder may be performed. The degreasing step may preferably be performed in an air atmosphere in order to decompose the organic components completely.

Also, the atmosphere of the firing step may preferably be the air atmosphere in terms of controlling electrical characteristics and production cost.

A firing furnace used in the firing step and the degreasing step is not particularly limited, but it may be an electric furnace, a gas furnace, or the like.

<Heater Element>

The heater element according to an embodiment of the present invention includes the above ceramic body (honeycomb structure 10).

Figure 3:
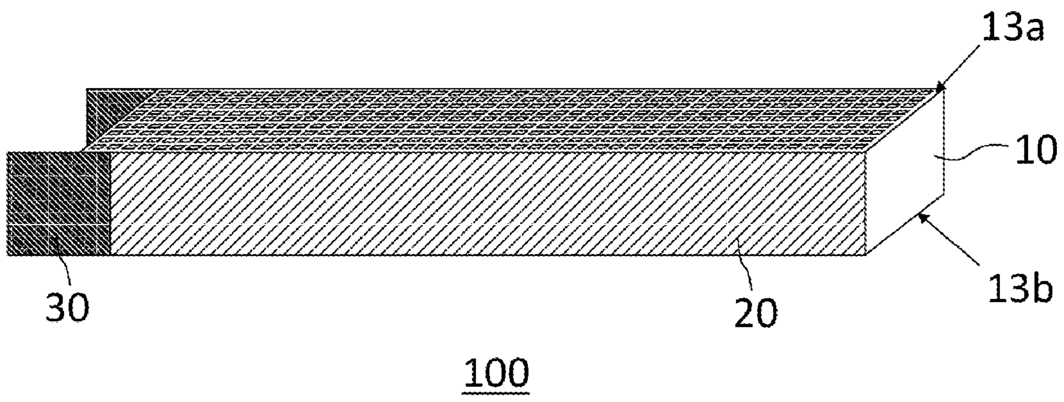
FIG. 3 is a schematic perspective view of a heater element according to an embodiment of the present invention.
Figure 4:
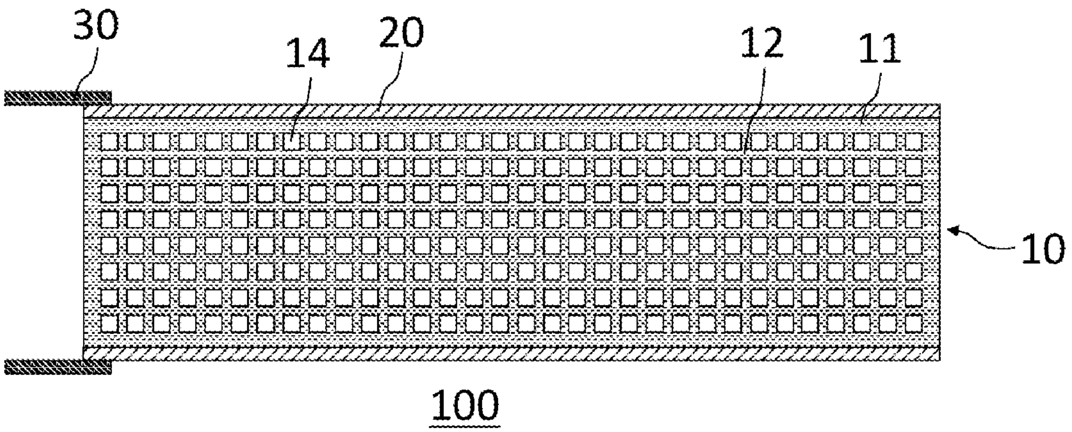
FIG. 4 is a schematic cross-sectional view of the heater element in FIG. 3 orthogonal to an extending direction of cells of a honeycomb structure.

FIG. 3 is a schematic perspective view of the heater element according to the embodiment of the present invention. Further, FIG. 4 is a schematic cross-sectional view of the heater element of FIG. 3, which is orthogonal to the extending direction of the cells of the honeycomb structure.

The heater element 100 according to the embodiment of the present invention includes the honeycomb structure 10 and a pair of electrodes 20 arranged on a surface of the outer peripheral wall 11 of the honeycomb structure 10.

The honeycomb structure 10 used for the heater element 100 preferably has a shape having a long axis and a short axis in a cross section orthogonal to the extending direction of the cells 14. Further, it is preferable that the pair of electrodes 20 are formed in a band shape extending in parallel with the extending direction of the cells 14, and arranged on the surface of the outer peripheral wall 11 so as to face each other across the long axis passing through the center of gravity of the honeycomb structure 10 in the cross section orthogonal to the extending direction of the cells 14. Further, it is preferable that the heater element 100 further includes a plate-shaped external connecting member 30 which is arranged on an end portion side of each electrode 20 and is in contact with each electrode 20 in a plane. By thus arranging the electrodes 20 and the external connecting members 30, the electrodes 20 and the external connecting members 30 are brought into surface contact with each other, which will easily increase an amount of power supplied from the outside, so that the heat generation performance can be improved.

Figure 5:
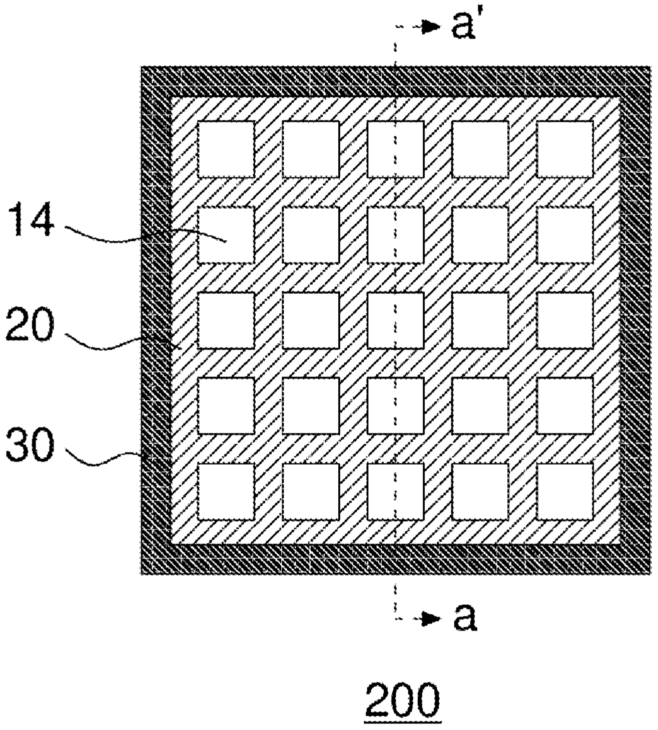
FIG. 5 is a schematic end view of another heater element according to an embodiment of the present invention.
Figure 6:
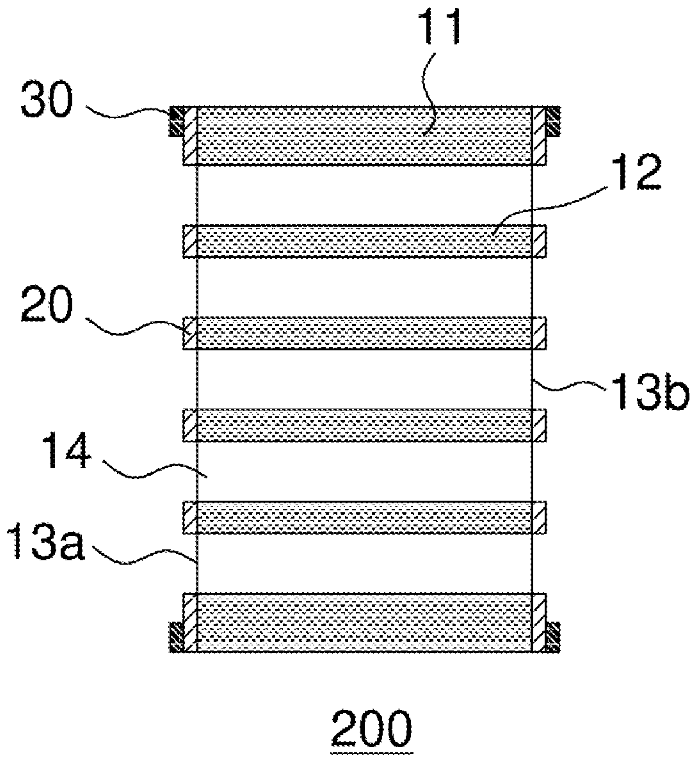
FIG. 6 is a schematic cross-sectional view taken along the line a-a' in the heater element of FIG. 5.

FIG. 5 is a schematic end view of another heater element according to an embodiment of the present invention (i.e., a schematic front view of another heater element according to an embodiment of the present invention as viewed from the first end face side of the honeycomb structure). Further, FIG. 6 is a schematic cross-sectional view of the heater element of FIG. 5 along the line a-a' (i.e., a schematic cross-sectional view of the heater element of FIG. 5 parallel to the extending direction of the cells of the honeycomb structure).

A heater element 200 according to an embodiment of the present invention includes the honeycomb structure 10 and the pair of electrodes 20 arranged on the surfaces of the outer peripheral wall 11 and the partition walls 12 on the first end face 13*a* and the second end face 13*b* of the honeycomb structure 10.

The honeycomb structure 10 used for the heater element 200 preferably has a shorter length in the extending direction of the cells 14. Such a structure can allow the honeycomb structure 10 having lower electric resistance at room temperature to be applied even to the heater element 200 having a structure in which the pair of electrodes 20 are arranged on the first end face 13*a* and the second end face 13*b*. Further, it is preferable that the heater element 200 further includes a plate-shaped external connecting member 30 on at least a part of the pair of electrodes 20, which is in contact with each electrode 20 in a plane. The arrangement of such an external connecting member 30 can lead to efficient conduction of current over the pair of electrodes 20 as a whole, thereby improving the heat generation performance.

Hereinafter, each component of the heater elements 100, 200 will be described in detail.

(2-1) Pair of Electrodes 20 in Heater Element 100

The pair of electrodes 20 can be provided on the surface of the outer peripheral wall 11 of the honeycomb structure 10. The pair of electrodes 20 are formed in a band shape extending in parallel with the extending direction of the cells 14 of the honeycomb structure 10. Further, the pair of electrodes 20 are arranged on the surface of the outer peripheral wall 11 so as to face each other across the long axis passing through the center of gravity of the honeycomb structure 10 in the cross section orthogonal to the extending direction of the cells 14 of the honeycomb structure 10. By applying a voltage through the pair of electrodes 20 thus arranged, electricity can be conducted to generate heat in the honeycomb structure 10 by Joule heat.

The electrode 20 that can be used herein includes, but not particularly limited to, a metal or alloy containing at least one selected from Zn, Cu, Ag, Al, Ni and Si. It is also possible to use an ohmic electrode layer capable of ohmic contact with the outer peripheral wall 11 and/or the partition walls 12, which has a PTC property. The ohmic electrode layer contains, for example, at least one selected from Al, Au, Ag and In as a base metal, and contains at least one selected from Ni, Si, Ge, Sn, Se and Te for n-type semiconductors as a dopant. Further, the electrode 20 may have one layer or two or more layers. When the electrode 20 has two or more layers, materials of the respective layers may be of the same type or different types.

The thickness of each electrode 20 is not particularly limited, but it may be appropriately set depending on the method of forming the electrodes 20. Examples of the method for forming the electrodes 20 include metal deposition methods such as sputtering, vapor deposition, electrolytic deposition, and chemical deposition. Further, the electrode 20 can be formed by applying an electrode paste and then baking the electrode paste. Further, the electrode 20 can also be formed by thermal spraying.

It is preferable that the thickness of each electrode 20 is from about 5 to 30 μm for baking of the electrode paste, from about 100 to 1000 nm for dry plating such as sputtering and vapor deposition, from about 10 to 100 μm for thermal spraying, or from about 5 to 30 μm for wet plating such as electrolytic precipitation and chemical precipitation.

(2-2) Pair of Electrodes 20 in Heater Element 200

The pair of electrodes 20 can be provided on the surfaces of the outer peripheral wall 11 and the partition walls 12 on the first end face 13*a* and the second end face 13*b* of the honeycomb structure 10.

The pair of electrodes 20 are preferably provided on the first end face 13*a* and the second end face 13*b* without blocking the cells 14, and more preferably provided on the entire first end face 13*a* and the entire second end face 13*b* without blocking the cells 14.

Since the other features of the electrodes 20 are the same as those set forth in (2-1), descriptions thereof will be omitted.

(2-3) External Connecting Member 30 in Heater Element 100

The external connecting member 30 has a plate shape and can be provided on the end portion side of each electrode 20 so as to be in contact with each electrode 20 in a plane. It is preferable that the external connecting member 30 extends parallel to the long axis passing through the center of gravity of the honeycomb structure 10 in the cross section orthogonal to the extending direction of the cells 14 of the honeycomb structure 10. By providing such a plate-shaped external connecting member 30, an amount of power supplied from the outside to the electrodes 20 can be easily increased, so that the heat generation performance can be improved.

As used herein, "the end portion side of each electrode 20" means a region up to 30% of the entire length of each electrode 20 from the end of each electrode 20 in the longitudinal direction passing through the center of gravity of the honeycomb structure 10 in the cross section orthogonal to the extending direction of the cells 14 of the honeycomb structure 10.

The external connecting member 30 may be arranged on the end portion side of each electrode 20, and may not necessarily be in contact with the end of each electrode 20. For example, the external connecting member 30 may be provided with bent portions, and the bent portions may be connected to the respective electrodes 20.

The external connecting member 30 preferably has the substantially same width as that of the end portion of the electrode 20 on the side where the external connecting member 30 is arranged. Such a configuration can increase a contact area of the electrode 20 with the external connecting member 30, so that the effect of improving the heat generation performance is enhanced.

As used herein, the phrase "substantially the same width as that of the end portion of the electrode 20" means that the width is within ±20% of the width of the end portion of the electrode 20.

It is preferable that each of the external connecting members 30 is arranged on one end portion side of the electrode 20 parallel to the extending direction of the cells 14 of the honeycomb structure 10. One end portion side on which the external connecting member 30 is arranged may be the same or different side in the cross section orthogonal to the extending direction of the cells 14 of the honeycomb structure 10. One end portion side is more preferably the same side. It is preferable that each of the external connecting members 30 extends in the same direction from the end portion side thereof to the outside. Such a configuration can lead to a compact heater element 100 when the honeycomb structure 10 is applied to the heater element 100.

The external connecting member 30 may be made of, for example, a metal, although not limited thereto. The metal that can be used herein includes a single metal, an alloy, and the like. In terms of corrosion resistance, electrical resistance, and linear expansion rate, for example, the metal may preferably be an alloy containing at least one selected from the group consisting of Cr, Fe, Co, Ni, Cu, and Ti, and more preferably stainless steel, Fe—Ni alloys, and phosphorus bronze.

The shape and size of the external connecting member 30 are not particularly limited, but they may be appropriately adjusted according to the structure of the heater unit to be produced.

A method of connecting each external connecting member 30 to each electrode 20 is not particularly limited as long as they are electrically connected. They may be connected by, for example, diffusion joining, a mechanical pressurizing mechanism, welding, or the like.

(2-4) External Connecting Member 30 in Heater Element 200

The external connecting member 30 has a plate shape and can be provided so as to be in contact with each electrode 20 in a plane.

The external connecting members 30 are preferably arranged on the electrodes 20 provided on the outer peripheral wall 11 of the first end face 13*a* and the second end face 13*b*. Such a configuration can lead to efficient conduction of current over the entire electrode 20.

Since the other features of the external connecting members 30 are the same as those set forth in (2-3), descriptions thereof will be omitted.

(2-5) Use Method

Each of the heater elements 100, 200 according to the embodiment of the present invention can be suitably used as a heater element for heating a vehicle interior of a vehicle.

Each of the heater elements 100, 200 according to the embodiment of the present invention can generate heat by applying a voltage from an external power source to the honeycomb structure 10 via the external connecting members 30 and the electrodes 20. The applied voltage is preferably from 12 to 800 V. Specifically, in the heater element 100, the applied voltage is preferably from 100 to 800 V. Further, in the heater element 200, the applied voltage is preferably from 12 to 60 V. The adjustment of the applied voltage to such range can suppress power consumption while performing rapid heating. Moreover, since the voltage is lower, the safety is higher. Furthermore, since the safety specifications are not severe, the equipment around the heater can be manufactured at lower cost.

When the honeycomb structure 10 generates heat due to the application of the voltage, the gas can be heated by allowing the gas to flow through the cells 14. The temperature of the gas flowing into the cells 14 can be, for example, −60° C. to 20° C., and typically −10° C. to 20° C.

Since the heater element 100 according to the embodiment of the present invention uses the honeycomb structure 10 having the PTC property and low electrical resistance at room temperature, it can be driven at a lower voltage.

Further, the heater element 100 according to the embodiment of the present invention has a simpler structure than that of an existing heater element in which a PTC element and an aluminum fin are integrated via an insulating ceramic plate, and can prevent the heater unit from becoming larger. Further, in the existing heater element, the PTC element is not in direct contact with the gas, resulting in an insufficient heating rate (heating time) of the gas, whereas in the heater element 100 according to the embodiment of the present invention, the honeycomb structure 10 in which the outer peripheral wall 11 and the partition walls 12 are made of a material having the PTC property is in direct contact with the gas, resulting in an increased heating rate of the gas.

Further, the heater element 100 according to the embodiment of the present invention is provided with the electrodes 20 and the external connecting members 30 as described above, so that it is easy to increase an amount of power supplied from the outside to the electrode 20, thus enabling the heat generation performance to be improved.

<Heater Unit>

The heater unit according to an embodiment of the present invention can be suitably used as a heater unit for heating a vehicle interior of a vehicle. In particular, since the heater unit according to the embodiment of the present invention uses a ceramic body (honeycomb structure 10) having a PTC property, which has low electrical resistance at room temperature, for the heater element 100, 200, it can be driven at a lower voltage. In particular, the arrangement of a plurality of heater elements 100, 200 in parallel can result in a practical heater unit that can be used at a lower voltage. Further, since the heater unit according to the embodiment of the present invention uses the heater elements 100, 200 having higher heat generation performance, the heat generation performance of the heater unit can be improved. Furthermore, since the heater elements 100, 200 can be made compact, it is possible to prevent the heater unit from becoming larger.

Figure 7:
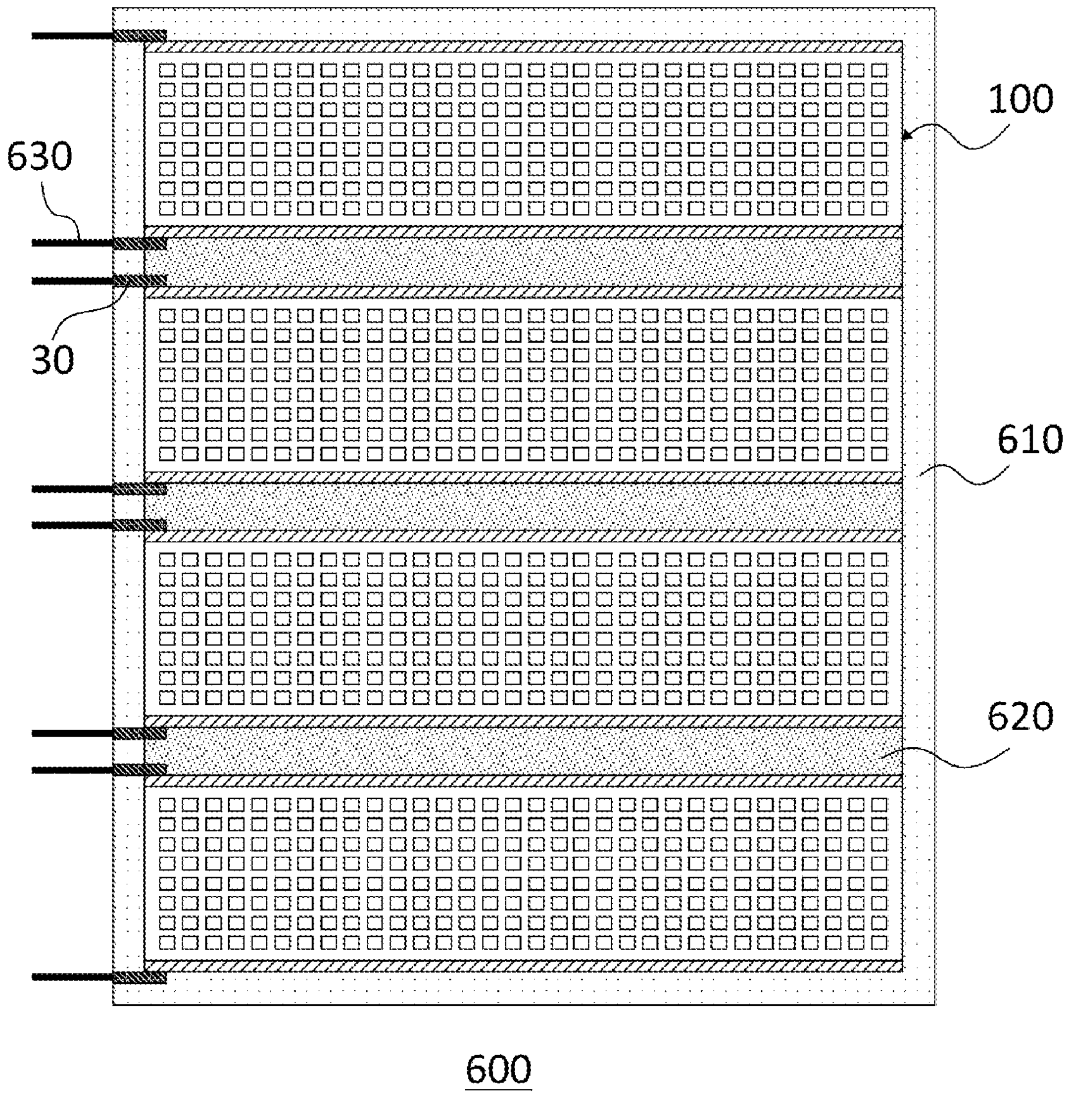
FIG. 7 is a schematic front view of a heater unit according to an embodiment of the present invention as viewed from a first end face side of a honeycomb structure.

FIG. 7 is a schematic front view of a heater unit according to an embodiment of the present invention as viewed from the first end face side of the honeycomb structure.

As shown in FIG. 7, a heater unit 600 according to an embodiment of the present invention includes two or more heater elements 100. Further, in the heater unit 600, the heater elements 100 are stacked so that the surfaces of the outer peripheral walls 11 of the honeycomb structures 10 including the long sides of the first end faces 13*a* and the second end faces 13*b* face each other. Such a configuration can produce a compact heater unit 600.

The heater unit 600 according to the embodiment of the present invention may further include a housing (housing member) 610.

The housing 610 may be made of any material, including, but not limited to, for example, metals and resins. Among them, the material of the housing 610 is preferably the resin. The housing 610 made of the resin can suppress electric shock without grounding.

The shape and size of the housing 610 are not particularly limited, but they may be the same as those of the existing heater unit.

The heater unit 600 according to the embodiment of the present invention may further include insulating materials 620 each arranged between the heater elements 100 which are stacked. Such a configuration can suppress an electrical short circuit between the plurality of heater elements 100.

The insulating materials 620 that can be used herein include plate materials, mats, clothes, and the like, which are formed of an insulating material such as alumina or ceramics.

The heater unit 600 according to the embodiment of the present invention can have a wiring structure capable of controlling the heater elements 100. More particularly, the heater unit 600 according to the embodiment of the present invention may further include wirings 630 connected to the external connecting members 30 of the heater element 100.

The wiring structure is not particularly limited, but as shown in FIG. 7, each of the heater elements 100 may be independently controllable. More particularly, the wiring 630 can be connected to each of the external connecting members 30 of the heater element 100. The wirings 630 are connected to an external power source (not shown). Such a wiring structure can allow the heater elements 100 to be each independently controlled, thereby enabling fine temperature tuning.

<Heater System>

The heater system according to an embodiment of the present invention can be suitably used as a heater system for heating a vehicle interior of a vehicle. Especially, in the heater system according to the embodiment of the present invention, the heater unit 600 that can be driven at a lower voltage is used, so that power consumption can be suppressed. Further, in the heater system according to the embodiment of the present invention, the heater unit 600 having high heat generation performance is used, so that the heat generation performance of the heater system can be improved. Furthermore, the heater unit 600 can be made compact, so that it is possible to prevent the heater system from becoming larger.

Figure 8:
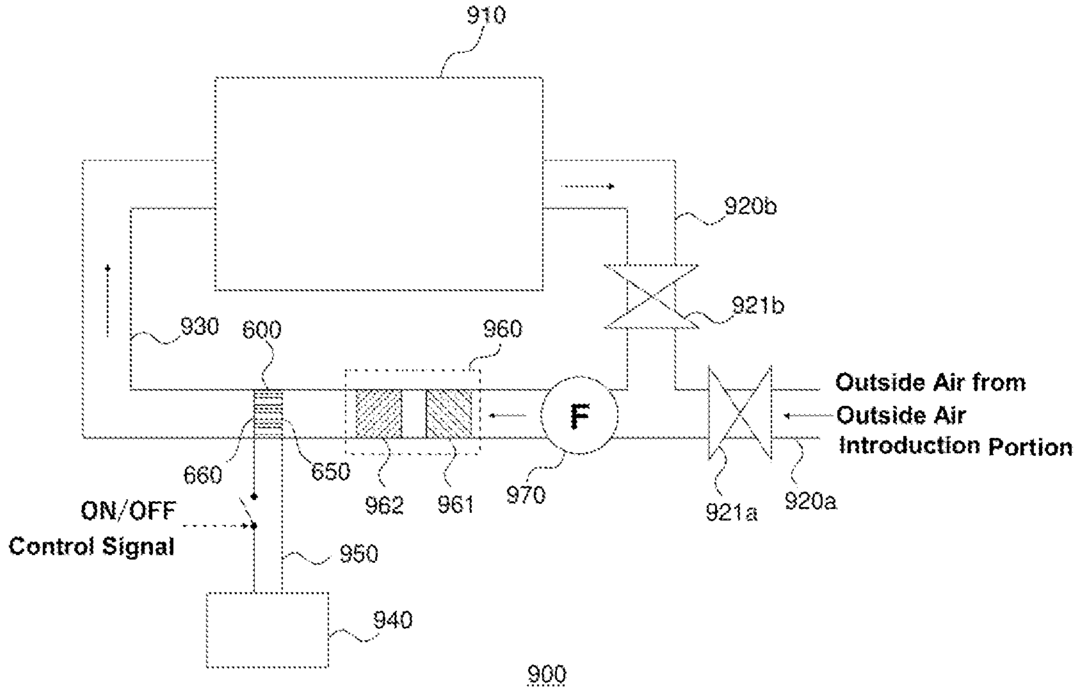
FIG. 8 is a schematic view showing an arrangement example of a heater system according to an embodiment of the present invention.

FIG. 8 is a schematic view showing an arrangement example of a heater system according to an embodiment of the present invention.

As shown in FIG. 8, a heater system 900 according to the embodiment of the present invention includes: the heater unit 600 according to the embodiment of the present invention; inflow pipes 920*a*, 920*b* for communicating an outside air introduction portion or a vehicle interior 910 with an inflow port 650 of the heater unit 600; a battery 940 for applying a voltage to the heater unit 600; and an outflow pipe 930 for communicating an outflow port 660 of the heater unit 600 with the vehicle interior 910.

The heater unit 600 can be configured to energize and generate heat by connecting to the battery 940 with an electric wire 950 and turning on a power switch in the middle of the wiring, for example.

Disposed on the upstream side of the heater unit 600 can be a vapor compression heat pump 960. In the heater system 900, the vapor compression heat pump 960 is configured as a main heating device, and the heater unit 600 is configured as an auxiliary heater. The vapor compression heat pump 960 can be provided with a heat exchanger including: an evaporator 961 that functions to absorb heat from the outside during cooling to evaporate a refrigerant; and a condenser 962 that functions to liquefy a refrigerant gas to release heat to the outside during heating. The vapor compression heat pump 960 is not particularly limited, and a vapor compression heat pump known in the art can be used.

On the upstream side and/or the downstream side of the heater unit 600, a blower 970 can be installed. In terms of ensuring safety by arranging high-voltage parts as far as possible from the vehicle interior 910, the blower 970 is preferably installed on the upstream side of the heater unit 600. As the blower 970 is driven, air flows into the heater unit 600 from the inside or outside of the vehicle interior 910 through the inflow pipes 920*a*, 920*b*. The air is heated while passing through the heating unit 600 that is generating heat. The heated air flows out from the heater unit 600 and is delivered into the vehicle interior 910 through the outflow pipe 930. The outlet of the outflow pipe 930 may be arranged near the feet of an occupant so that the heating effect is particularly high even in the vehicle interior 910, or a pipe outlet may be arranged in a seat to warm the seat from the inside, or may be arranged near a window to have an effect of suppressing fogging of the window.

The inflow pipe 920*a* and the inflow pipe 920*b* merge in the middle. The inflow pipe 920*a* and the inflow pipe 920*b* can be provided with valves 921*a* and 921*b*, respectively, on the upstream side of the confluence. By controlling the opening and closing of the valves 921*a*, 921*b*, it is possible to switch between a mode where the outside air is introduced into the heater unit 600 and a mode where the air in the vehicle interior 910 is introduced into the heater unit 600. For example, the opening of the valve 921*a* and the closing of the valve 921*b* results in the mode where the outside air is introduced into the heater unit 600. It is also possible to open both the valve 921*a* and the valve 921*b* to introduce the outside air and the air in the vehicle interior 910 into the heater unit 600 at the same time.

<Purification System>

The purification system according to an embodiment of the present invention can also be suitably used as a purification system for removing harmful components in a vehicle interior of a vehicle. In particular, the purification system according to the embodiment of the present invention uses the heater element including the ceramic body having low electric resistance at room temperature or the heater unit including two or more heater elements, so that the purification performance can be obtained while suppressing power consumption.

The heater element used in the purification system according to the embodiment of the present invention includes: the ceramic body (honeycomb structure 10) as described above; an adsorbent provided on surfaces of the partition walls 12 of the honeycomb structure 10; and a pair of electrodes 20 provided on the first end face 13*a* and the second end face 13*b* of the honeycomb structure 10.

Figure 9:
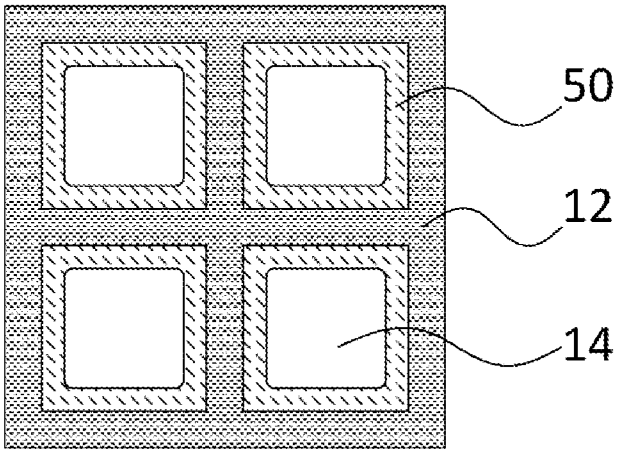
FIG. 9 is a schematic enlarged cross-sectional view orthogonal to an extending direction of cells of a honeycomb structure provided with an adsorbent.

Here, FIG. 9 shows a schematic enlarged cross-sectional view orthogonal to the extending direction of the cells 14 of the honeycomb structure 10 provided with the adsorbent.

As shown in FIG. 9, the surfaces of the partition walls 12 of the honeycomb structure 10 are provided with adsorbents 50. Thus, the providing of the adsorbents 50 can absorb harmful volatile components from the air flowing in the cells 14. The harmful volatile components include, for example, volatile organic compounds (VOCs) and odorous components. Specific examples of the harmful volatile components include ammonia, acetic acid, isovaleric acid, nonenal, formaldehyde, toluene, xylene, paradichlorobenzene, ethylbenzene, styrene, chlorpyrifos, di-n-butyl phthalate, tetradecane, di-2-ethylhexyl phthalate, diazinon, acetaldehyde, and 2-(1-methylpropyl)phenyl N-methylcarbamate.

The adsorbent 50 may be appropriately selected depending on the volatile components to be adsorbed, and is not particularly limited. Examples of the adsorbent 50 include zeolite and the like. Further, if the adsorbent 50 capable of adsorbing $CO_2$ at room temperature and releasing $CO_2$ at higher temperature is selected, $CO_2$ in the vehicle interior can be discharged to the outside of the vehicle. Further, the use of the adsorbent 50 in combination with a noble metal such as Pt or an oxidation catalyst of a metal oxide can lead to easy removal of the harmful volatile components from the air flowing through the cells 14.

The heater element used in the purification system according to the embodiment of the present invention may be provided with the external connecting members 30 on the pair of electrodes 20 arranged on the first end face 13*a* and the second end face 13*b* (for example, on the outer peripheral portions of the electrodes 20 arranged on the outer peripheral wall 11 of the honeycomb structure 10).

The heater element used in the purification system according to the embodiment of the present invention can be produced according to the above method. For example, an electrode paste can be applied to the first end face 13*a* and the second end face 13*b* of the honeycomb structure 10 and baked to form the electrodes 20, and the surfaces of the partition walls 12 can be then coated with the adsorbent 50 to produce a heater element. The coating method of the adsorbent 50 is not particularly limited, but for example, the honeycomb structure 10 may be immersed in a slurry containing the adsorbent 50, an organic binder, and water, and excess slurry on the end faces and the outer periphery of the honeycomb structure 10 is removed by blowing or wiping. Subsequently, the slurry can be dried at a temperature of about 550° C. to provide the adsorbents 50 on the surfaces of the partition walls 12. This step may be performed once, but this step may be repeated several times to provide a desired amount of the adsorbent 50 on the surfaces of the partition walls 12.

Further, when the external connecting members 30 are provided, the external connecting members 30 may be arranged at predetermined positions of the electrodes 20 and joined thereto.

Figure 10:
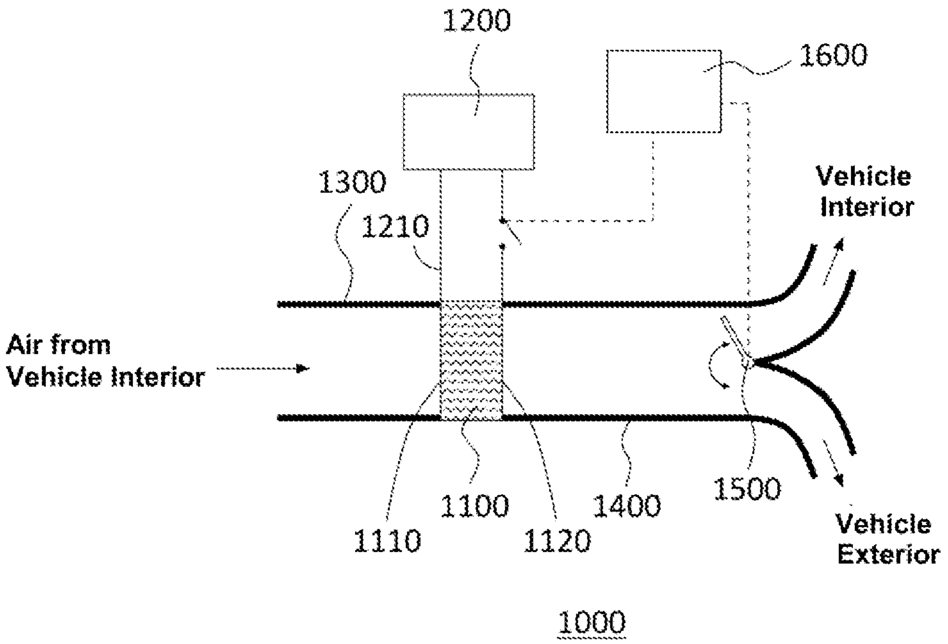
FIG. 10 is a schematic view showing an arrangement example of a purification system according to an embodiment of the present invention.

FIG. 10 is a schematic view showing an arrangement example of a purification system according to an embodiment of the present invention.

As shown in FIG. 10, a purification system 1000 according to an embodiment of the present invention includes: the heater element or heater unit 1100 as described above; a battery (power supply) 1200 for applying a voltage to a pair of electrodes 20 of the heater element or heater unit 1100; an inflow pipe 1300 for communicating a vehicle interior with an inflow port 1110 of the heater element or heater unit 1100; an outflow pipe 1400 for communicating an outflow port 1120 of the heater element or heater unit 1100 with the vehicle interior and a vehicle exterior; and a switching valve 1500 which is arranged in the outflow pipe 1400 and which can switch the flow of air flowing through the outflow pipe 1400 to the vehicle interior or the vehicle exterior.

The heater element or the heater unit 1100 can be configured to energize and generate heat by connecting to the battery 1200 via an electric wire 1210 and turning on a power switch in the middle of the wire, for example.

The switching between ON and OFF of the power switch can be performed by a control unit 1600 electrically connected to the power switch. Further, the switching of the switching valve 1500 can also be performed by the control unit 1600 electrically connected to the switching valve.

In the purification system 1000 having the above structure, the air from the vehicle interior is fed from the inflow port 1110 to the heater element or the heater unit 1100 through the inflow pipe 1300. After performing predetermined processing by the heater element or the heater unit 1100, the air is discharged from the outflow port 1120 and returned to the vehicle interior through the outflow pipe 1400 or discharged to the vehicle exterior.

When closing the flow path of the outflow pipe 1400 to the vehicle exterior with the switching valve 1500 so that the air returns to the vehicle interior, the power switch is turned off and the heater element or the heater unit 1100 is maintained at room temperature. Such a control can allow the harmful volatile components contained in the air from the vehicle interior to be removed by adsorbing them to the adsorbents 50 of the heater element or the heater unit 1100.

On the other hand, when the flow path of the outflow pipe 1400 to the vehicle interior is closed by the switching valve 1500 so that the air is discharged to the vehicle exterior, the power switch is turned on to heat the heater element or the heater unit 1100. Such a control can release the harmful volatile components adsorbed on the adsorbents 50 of the heater element or the heater unit 1100 to regenerate the function of the adsorbents 50, and to discharge the harmful volatile components to the vehicle exterior.

By repeating the switching of the power switch and the switching valve 1500 as described above in a fixed cycle, it is possible to discharge stably the harmful volatile components in the vehicle interior to the vehicle exterior.

In the purification system 1000, the heater element or the heater unit 1100 is preferably arranged at a position close to the vehicle interior, in terms of stably ensuring the above functions. Therefore, from the viewpoint of preventing electric shock, the drive voltage is preferably 60 V or less. Since the honeycomb structure 10 used in the heater element or the heater unit 1100 has lower electrical resistance at room temperature, the honeycomb structure 10 can be heated at the lower drive voltage. The lower limit of the drive voltage is not particularly limited, but it may preferably be 10 V. If the drive voltage is less than 10 V, the current during heating of the honeycomb structure 10 is increased, so that the electric wire 1210 must be thickened.

If the diameter of the short axis (thickness of the honeycomb structure 10) in the cross section orthogonal to the extending direction of the cells 14 is smaller, the amount of the adsorbent 50 may be insufficient. Therefore, it is preferable to use the heater unit in the purification system 1000 from the viewpoint of sufficiently ensuring the absorption function. As described above, the heater unit can be produced by arranging a plurality of heater elements in parallel. By using the heater unit, the amount of the adsorbent 50 can be increased, and the heating speed and the cooling speed of the honeycomb structure 10 can be increased when the power switch is switched on and off. Therefore, the practicality of the purification system 1000 can be improved.

From the viewpoint of efficiently improving the adsorption function of the adsorbent 50, the thickness of the adsorbent 50 provided on the surfaces of the partition walls 12 should not be too large. This is because if the adsorbent 50 is too thick, it will be difficult to be brought into contact with the air flowing in the cells 14, and an efficiency of the adsorbing function is decreased. Therefore, the thickness of the adsorbent 50 is preferably from 0.01 to 0.5 mm.

EXAMPLES

Hereinafter, the present invention will be described in more detail with reference to Examples, but the present invention is not limited to these Examples.

(1) Production of Ceramic Body

Examples 1 to 6, Comparative Examples 1 and 2

As ceramic raw materials, $BaCO_3$ powder, $TiO_2$ powder, $La(NO_3)_3 \cdot 6H_2O$ powder and $SrCO_3$ were prepared. These powders were weighed so as to have the composition shown in Table 1 after firing, and dry-mixed to obtain a mixed powder. The dry mixing was carried out for 30 minutes. Subsequently, from 3 to 30 parts by weight of water, a binder, a plasticizer and a dispersant in total were added by a proper amount, based on 100 parts by mass of the obtained mixed powder, such that ceramic formed bodies having the relative density shown in Table 1 were obtained after extrusion, and then kneaded to obtain green bodies. Methyl cellulose was used as the binder. Polyoxyalkylene alkyl ether was used as the plasticizer and the dispersant.

Each green body was introduced into an extrusion molding machine and extruded using a predetermined die to obtain a rectangular parallelepiped honeycomb formed body. The density of the honeycomb formed body was measured according to the above method.

The obtained honeycomb formed body was subjected to dielectric drying and hot air drying, and both end faces were cut to have predetermined dimensions to obtain a honeycomb dried body.

The shape of the dried honeycomb is as follows:

Overall shape: rectangular parallelepiped having 45 mm×45 mm×200 mm in height (extending direction of the cells);

Cell shape in cross section orthogonal to extending direction of cell: square;

Cell density: 62 cells/$cm^2$; and

Thickness of partition wall: 4 mil (101.6 μm).

The honeycomb dried body was cut to have a height of 35 mm, and then degreased in an air atmosphere (450° C. for 4 hours) in a firing furnace, and then fired in an air atmosphere to obtain a ceramic body. The conditions of the firing step were as shown in Table 1. More particularly, the firing step carried out a maintaining step A, a maintaining step B, and a maintaining step C in this order. It should be noted that the maintaining step C is a maintaining step at the maximum temperature.

The following evaluations were performed on the obtained ceramic body.

Comparative Examples 3 and 4

Ceramic bodies were prepared in the same method as that of Example 1 or the like, with the exception that $SrCO_3$ was not used.

(2) Chemical Analysis

The chemical composition of each ceramic body was analyzed by ICP emission spectroscopy, and amounts of elements such as La, Ba, Ti and Sr were determined. From the amount of each element obtained by this analysis, the substituted amount of 1 mol of Ba with La (x value), the substituted amount of 1 mol of Ba with Sr (y value), and a mole ratio: (Ba+La+Sr)/Ti in $BaTiO_3$-based crystalline particles are shown in Table 1. Moreover, the analysis results confirmed that the ceramic bodies produced in Examples and Comparative Examples did not contain Pb and an alkali metal.

(3) Identification of Crystalline Particles and Lattice Volume of $BaTiO_3$-Based Crystalline Particles Crystal particles of each ceramic body were identified using an X-ray diffractometer. As the X-ray diffractometer, a multifunctional powder X-ray diffractometer (D8Avance from Bruker) was used. The conditions for the X-ray diffraction measurement were: a CuKα radiation source; 10 kV; 20 mA; 2θ=5 to 100°. The obtained X-ray diffraction data was then analyzed by the Rietveld method using an analysis software TOPAS (from BrukerAXS) to identify the crystalline particles.

The lattice volume of the $BaTiO_3$-based crystal particles was determined by calculation from the lattice constant obtained by the analysis of the X-ray diffraction data.

Table 1 shows these results.

(4) Content of Each Crystal Particle

The content of each crystal particle was measured using an X-ray diffractometer. As the X-ray diffractometer, the same equipment and analysis software as described above were used, and the content of each crystal particle was determined by the Rietveld method.

(5) Measurement of Average Crystal Grain Size

The average crystal grain size of each ceramic body was measured according to the above method. The SEM observation was carried out using a model S-3400N from by Hitachi High-Tech Corporation at an acceleration voltage of 15 kV and at magnifications of 3000. The results are shown in Table 1.

(6) Open Porosity

The open porosity of each ceramic body was measured according to the above method. The results are shown in Table 1.

(7) Bulk Density

The bulk density of each ceramic body was measured according to the above method. The results are shown in Table 1.

(8) Curie Temperature

After forming a pair of electrodes in a form of a band on a surface of the outer peripheral wall parallel to the cell extending direction of the ceramic body, a voltage of 1 V was applied to the pair of electrodes at room temperature to measure a resistance value. Similarly, the temperature dependence of the resistance value was determined by measuring the resistance value while increasing the temperature of the pair of electrodes. In the resulting temperature dependence of the resistance value, a temperature at which the resistance value was three times the resistance value at room temperature was defined as the Curie temperature. The results are shown in Table 1.

(8) Volume Resistivity

The volume resistivity of each ceramic body at room temperature (25° C.), 120° C. and 200° C. was measured according to the above method. The measured value of the volume resistivity was an average value of the measured volume resistivities. The results are shown in Table 1.

TABLE 1

| | | Examples | | | | | | Comparative Examples | | | |
|---|---|---|---|---|---|---|---|---|---|---|---|
| | | 1 | 2 | 3 | 4 | 5 | 6 | 1 | 2 | 3 | 4 |
| Relative Density (%) of Ceramic Formed Body | | 61.7 | 64.8 | 62.1 | 62.1 | 64.3 | 64.3 | 61.9 | 61.9 | 62.5 | 64.8 |
| Firing Step | Maintaining Step A | 950° C. × 1 hr | 950° C. × 1 hr | 950° C. × 1 hr | 950° C. × 1 hr | 950° C. × 1 hr | 950° C. × 1 hr | 950° C. × 1 hr | 950° C. × 1 hr | 950° C. × 1 hr | 950° C. × 1 hr |
| | Maintaining Step B | 1200° C. × 1 hr | 1200° C. × 1 hr | 1200° C. × 1 hr | 1200° C. × 1 hr | 1200° C. × 1 hr | 1200° C. × 1 hr | 1200° C. × 1 hr | 1200° C. × 1 hr | 1200° C. × 1 hr | 1200° C. × 1 hr |
| | Maintaining Step C | 1400° C. × 2 hrs | 1400° C. × 2 hrs | 1400° C. × 2 hrs | 1400° C. × 2 hrs | 1400° C. × 2 hrs | 1400° C. × 2 hrs | 1400° C. × 2 hrs | 1400° C. × 2 hrs | 1400° C. × 2 hrs | 1400° C. × 2 hrs |
| | Heating Rate (° C./hr) from Maintaining Step B to Maintaining Step C (Maximum Temperature) | 200 | 200 | 50 | 200 | 200 | 50 | 200 | 200 | 200 | 200 |
| Ceramic Body | $BaTiO_3$-based Crystalline Particle (% by mass) | 95.3 | 94.7 | 96.7 | 96.2 | 93.7 | 92.5 | 88.8 | 89.3 | 96.2 | 95.0 |
| | $Ba_6Ti_{17}O_{40}$ Crystalline Particle (% by mass) | 4.3 | 5.2 | 3.3 | 3.4 | 6.0 | 7.3 | 8.0 | 8.5 | 3.1 | 4.0 |
| | $BaCO_3$ Crystalline Particle (% by mass) | 0.3 | 0.1 | 0.0 | 0.4 | 0.3 | 0.2 | 0.4 | 0.0 | 0.6 | 1.0 |
| | $Ba_2TiO_4$ Crystalline Particle (% by mass) | 0.0 | 0.0 | 0.0 | 0.0 | 0.0 | 0.0 | 2.8 | 2.1 | 0.0 | 0.0 |
| | Substituted Amount with La/x Value (mole) of $BaTiO_3$-Based Crystalline Particles | 0.001 | 0.001 | 0.001 | 0.001 | 0.001 | 0.001 | 0.001 | 0.001 | 0.001 | 0.001 |
| | Substituted Amount with Sr/y Value (mole) of $BaTiO_3$-Based Crystalline Particles | 0.010 | 0.030 | 0.030 | 0.030 | 0.100 | 0.100 | 0.200 | 0.100 | 0.000 | 0.000 |
| | Mole Ratio: (Ba + La + Sr)/Ti of $BaTiO_3$-Based Crystalline Particles | 1.020 | 1.020 | 1.005 | 1.005 | 1.005 | 1.005 | 1.030 | 1.030 | 1.020 | 1.030 |
| | Lattice Volume of $BaTiO_3$-based Crystalline Particle (Å$^3$) | 64.340 | 64.229 | 64.232 | 64.230 | 63.831 | 63.831 | 63.818 | 63.818 | 64.394 | 64.391 |
| | Average Crystal Grain Size (μm) of $BaTiO_3$-based Crystalline Particle | 55 | 38 | 94 | 77 | 16 | 47 | 18 | 37.5 | 28 | 20 |
| | Open Porosity (%) | 2.9 | 3.2 | 3.3 | 2.9 | 6.2 | 2.4 | 3.5 | 2.2 | 2.8 | 2.2 |
| | Bulk Density (g/cm$^3$) | 5.58 | 5.51 | 5.33 | 5.49 | 5.31 | 5.51 | 5.43 | 5.38 | 5.48 | 5.66 |
| | Curie Temperature (° C.) | 121 | 112 | 108 | 107 | 98 | 97 | 86 | 102 | 123 | 116 |
| | R.T Volume Resistivity (Ω cm) | 13 | 13 | 17 | 10 | 11 | 15 | 61 | 52 | 16 | 14 |
| | 120° C. Volume Resistivity (Ω cm) | 33 | 56 | 91 | 62 | 143 | 375 | 11601 | 480 | 33 | 46 |
| | 200° C. Volume Resistivity (Ω cm) | 16476 | 15275 | 43758 | 17763 | 12105 | 33127 | 861395 | 66280 | 2618 | 1070 |
| | 200° C. Volume Resistivity/R.T Volume Resistivity | 1267 | 1209 | 2625 | 1709 | 1130 | 2275 | 10855 | 1287 | 163 | 76 |

As shown in Table 1, each of the ceramic bodies according to Examples 1 to 6 had a very low volume resistivity of 20 Ω·cm or less at room temperature, and a higher volume resistivity at 200° C. of 500 times or more the volume resistivity at room temperature.

On the other hand, the ceramic body according to Comparative Example 1 had a higher volume resistivity at room temperature, because the substituted amount with Sr are too high.

The ceramic body according to Comparative Example 2 had a higher volume resistivity at room temperature, because the content of $Ba_6Ti1_7O_{40}$ crystalline particles was too high.

In the ceramic bodies according to Comparative Examples 3 and 4, a part of Ba was not substituted with Sr, so that the volume resistivity at 200° C. could not be sufficiently increased.

As can be seen from the above results, according to the present invention, it is possible to provide a ceramic body, honeycomb structure, and a method for producing the ceramic body, which have a lower room temperature electrical resistivity and a 200° C. resistivity of 500 times or more the room temperature resistivity. Also, according to the present invention is to provide a heater element including such a honeycomb structure.

DESCRIPTION OF REFERENCE NUMERALS

10 Honeycomb Structure
11 outer peripheral wall
12 partition wall
13*a* first end face
13*b* second end face
14 cell
17 honeycomb joined body
18 honeycomb segment
19 Joining layer
20 electrode
30 external connecting member
50 adsorbent
100,200 heater element
600 heater unit
610 housing
620 insulating material
650, 1110 inflow port
660, 1120 outflow port
900 heater system
910 vehicle interior
920*a*, 920*b*, 1300 Inflow pipe
921*a*, 921*b* valve
930, 1400 outflow pipe
940, 1200 battery
950, 1210 electric wire
960 vapor compression heat pump
961 evaporator
962 condenser
970 blower
1000 purification system
1100 heater element or heater unit
1500 switching valve
1600 control unit

The invention claimed is:

1. A ceramic body, the ceramic body being mainly based on $BaTiO_3$-based crystalline particles in which a part of Ba is substituted with at least one rare earth element and at least one alkaline earth metal element,
wherein the ceramic body comprises from 1.0 to 8.0% by mass of $Ba_6Ti_{17}O_{40}$ crystalline particles, and
wherein the $BaTiO_3$-based crystalline particles have a substituted amount of the at least one alkaline earth metal element, and
wherein the substituted amount of the at least one alkaline earth metal element is 0.01 to 0.10 mol per 1 mol of the Ba.

2. The ceramic body according to claim 1, wherein the $BaTiO_3$-based crystalline particles have a substituted amount of the at least one rare earth element, and
wherein the substituted amount of the at least one rare earth element is 0.001 to 0.010 mol per 1 mol of the Ba.

3. The ceramic body according to claim 1, wherein the $BaTiO_3$-based crystalline particles have a mole ratio: (Ba+rare earth element+alkaline earth metal element)/Ti of from 1.001 to 1.020.

4. The ceramic body according to claim 1, wherein the rare earth element is La, and the alkaline earth metal element is at least one of Sr and Ca.

5. The ceramic body according to claim 1, wherein the $BaTiO_3$-based crystalline particles have a lattice volume of 63.800 to 64.360 $Å^3$.

6. The ceramic body according to claim 1, wherein the $BaTiO_3$-based crystalline particles have an average crystal grain size of 10 to 100 μm.

7. The ceramic body according to claim 1, wherein the ceramic body has an open porosity of 7.0% or less.

8. The ceramic body according to claim 1, wherein the ceramic body has a bulk density of 5.30 $g/cm^3$ or more.

9. The ceramic body according to claim 1, wherein the ceramic body comprises 1.0% by mass or less of $BaCO_3$ crystalline particles.

10. The ceramic body according to claim 1, wherein the ceramic body comprises a Pb content of 0.01% by mass or less.

11. The ceramic body according to claim 1, wherein the ceramic body comprises a content of an alkali metal element of 0.01% by mass or less.

12. The ceramic body according to claim 1, wherein the ceramic body has a volume resistivity of 20 Ω·cm or less as measured at 25° C.

13. The ceramic body according to claim 1, wherein the ceramic body has a volume resistivity of 30 Ω·cm to 500 Ω·cm as measured at 120° C.

14. The ceramic body according to claim 1, wherein the volume resistivity measured at 200° C. is 500 times or more the volume resistivity measured at 25° C.

15. A honeycomb structure, comprising: an outer peripheral wall; and partition walls disposed on an inner side of the outer peripheral wall, the partition walls defining a plurality of cells, each of the cells forming a flow path from a first end face to a second end face,
wherein the outer peripheral wall and the partition walls are made of the ceramic body according to claim 1.

16. The honeycomb structure according to claim 15, wherein the honeycomb structure has an average thickness of the partition walls of from 50 to 130 μm and a cell density of from 15 to 140 $cells/cm^2$.

17. A method for producing the ceramic body according to claim 1, the method comprising:
a forming step of forming a green body containing a ceramic raw material comprising $BaCO_3$ powder, $TiO_2$ powder, at least one powder selected from carbonates, sulfates and acetates of alkaline earth metals, and powder of a nitrate and/or hydroxide of a rare earth to produce a ceramic formed body having a relative density of 60% or more; and a firing step of maintaining the ceramic formed body at a temperature of 1150 to 1250° C., and then increasing the temperature to a maximum temperature of 1360 to 1430° C. at a heating rate of 20 to 500° C./hour and maintaining it for 0.5 to 5 hours.

18. The method for producing the ceramic body according to claim 17, wherein a retention time at the temperature of 1150 to 1250° C. is 0.5 to 5 hours.

19. The method for producing the ceramic body according to claim 17, wherein the firing step comprises maintaining the ceramic formed body at a temperature of 900 to 950° C. for 0.5 to 5 hours, prior to the maintaining at the temperature of 1150 to 1250° C.

20. A heater element comprising the honeycomb structure according to claim 15.

* * * * *